US006838516B2

(12) United States Patent
Dai et al.

(10) Patent No.: US 6,838,516 B2
(45) Date of Patent: Jan. 4, 2005

(54) WATER DISPERSIBLE POLYISOCYANATE COMPOSITION AND ITS USES

(75) Inventors: Shenghong A. Dai, Taichung (TW); Jui-Ming Chang, Taichung (TW); Tsai-Lung Chen, Taichung (TW); Will Yang, Taichung (TW)

(73) Assignee: Great Eastern Resins Industrial Co., Ltd., Taichung (TW)

( * ) Notice: Subject to any disclaimer, the term of this patent is extended or adjusted under 35 U.S.C. 154(b) by 0 days.

(21) Appl. No.: 10/206,543

(22) Filed: Jul. 26, 2002

(65) Prior Publication Data

US 2004/0019160 A1 Jan. 29, 2004

(51) Int. Cl.[7] .................. C08L 75/08; C09J 129/04; C09J 131/04; C09J 133/04; C09J 175/04
(52) U.S. Cl. .................. 525/58; 525/131; 525/457; 525/458; 528/76; 528/77; 524/503; 524/507; 524/591
(58) Field of Search .................. 525/58, 131, 457, 525/458; 528/76, 77; 524/503, 507, 591

(56) References Cited

U.S. PATENT DOCUMENTS

| 3,965,051 | A | 6/1976 | Markusch et al. ............ 260/2.5 |
| 3,977,889 | A | 8/1976 | Shearing ...................... 106/96 |
| 4,143,014 | A | 3/1979 | McLaughlin et al. ......... 260/29.2 |
| 4,228,853 | A | 10/1980 | Harvey et al. ............... 166/248 |
| 4,518,522 | A | 5/1985 | Markusch et al. ...... 252/188.31 |
| 4,630,963 | A | 12/1986 | Wyman ........................ 404/75 |
| 4,663,377 | A | 5/1987 | Hombach et al. ............ 524/196 |
| 4,939,191 | A | 7/1990 | Kataoka et al. ................ 524/5 |
| 5,086,175 | A | 2/1992 | Minato et al. ............... 544/221 |
| 5,200,489 | A | 4/1993 | Jacobs et al. ................. 528/49 |
| 5,235,018 | A | 8/1993 | Potter et al. .................. 528/49 |
| 5,252,696 | A | 10/1993 | Laas et al. .................... 528/49 |
| 5,563,207 | A | 10/1996 | Brahm et al. ............... 524/591 |
| 5,731,396 | A | 3/1998 | Laas et al. .................... 528/49 |
| 6,007,619 | A | 12/1999 | Laas et al. .................. 106/727 |
| 6,201,606 | B1 | 3/2001 | Ashibe ........................ 356/432 |
| 6,204,323 | B1 | 3/2001 | Wamprecht et al. ........ 524/591 |
| 6,221,995 | B1 | 4/2001 | Yukio et al. .................. 528/28 |
| 6,310,172 | B1 | 10/2001 | Jansen et al. ................. 528/49 |
| 6,426,414 | B1 | 7/2002 | Laas et al. .................. 544/222 |

*Primary Examiner*—Patricia A. Short
(74) *Attorney, Agent, or Firm*—Ladas & Parry

(57) ABSTRACT

The present invention relates to a water dispersible polyisocyanate composition comprising
(a) an aliphatic polyisocyanate or a mixture of aliphatic polyisocyanates or a mixture of aliphatic polyisocyanates with other polyisocyanates; and
(b) a reaction product of component (a) with a component selected from the group consisting of:
(ii) a polyether diol or triol or a mixture thereof wherein a weight ratio of ethylene oxide (EO) to propylene oxide (PO) of the polyether diol and triol is greater than about 60:40, and the polyether diol has a molecular weight of about 300 to 1600 g/mole, and the polyether triol has a molecular weight of about 450 to 2400 g/mole; and
(ii) a mixture of polyether monol and polyether polyol, wherein the polyether polyol is selected from the group consisting of polyether diol, triol and a mixture thereof wherein a weight ratio of EO to PO of the polyether monol, diol and triol is greater than about 60:40, and the polyether diol and triol have the molecular weights as defined above.

24 Claims, No Drawings

WATER DISPERSIBLE POLYISOCYANATE COMPOSITION AND ITS USES

FIELD OF THE INVENTION

The present invention relates to a water dispersible polyisocyanate composition, and to an aqueous resin adhesive comprising such water dispersible polyisocyanate composition as a crosslinking agent and an aqueous resin containing active hydrogen reactive groups.

BACKGROUND OF THE INVENTION

Water dispersible polyisocyanates are commonly applied in the adhesives based on the aqueous resins as crosslinking agents. Particularly, the isocyanates are highly reactive to the compounds having active hydrogen groups so as to form, for example, urethane, urea, amide, allophanate, and biuret products. Thus, the polyisocyanates are advantageous to the molecular growth and crosslinking of the resins so as to extensively improve their adhesion, heat resistance, and mechanical performance when being used as adhesives. The characteristic of high reactivity of the polyisocyanates allows them to be an excellent crosslinking agent for the aqueous resins.

The preparations and applications of the water dispersible polyisocyanates are known and have been disclosed. For example, U.S. Pat. No. 4,663,377 discloses a polyisocyanate preparation dispersible in water and having an average NCO functionality of about 2.0 to 3.5, for use as an additive for aqueous adhesives based on polymers dispersed in water. According to the teachings of U.S. Pat. No. 4,663,377, polyether monols, such as poly ethoxylated ether monol exemplified in the examples provided thereof, are particularly suitable for the production of the water dispersible polyisocyanate preparation.

U.S. Pat. No. 5,200,489 relates to the use of a polyether monol to modify polyisocyanates based on 1,6-hexamethylene diisocyanate (HDI) or a mixture of HDI with up to 70% by weight, based on the weight of the diisocyanate, of another diisocyanate, to obtain a water dispersible polyisocyanate composition having an average NCO functionality of 2 to 6, and further provides a method for testing the water dispersibility of the polyisocyanate composition. The test results show that the polyether monol in an amount of about 10 wt % and having a molecular weight of 200 to 1000 g/mole is more favorable to improve the water dispersibility of the polyisocyanate composition.

U.S. Pat. No. 5,252,696 teaches a water dispersible polyisocyanate mixture obtained by reacting an aliphatic polyisocyanate having an NCO functionality of about 2.1 to 4.4, such as HDI trimer, with a polyether monol containing 5 to 9.9 ethylene oxide (EO) units, at an NCO/OH equivalent ratio of 4:1 to 120:1. The obtained water dispersible polyisocyanate mixture is suitable for two-component aqueous resins.

U.S. Pat. No. 5,563,207 is directed to a method for the preparation of a water dispersible polyisocyanate composition based on modified aliphatic and modified aromatic diisocyanates for use in aqueous coating compositions, especially an aqueous polyvinyl acetate coating, as a binder. Furthermore, the polyisocyanate composition of U.S. Pat. No. 5,563,207 is prepared by reacting a polyisocyanate component, e.g., modified HDI/toluene diisocyanate trimer, with a poly ethoxylated ether monol having a molecular weight of 550 g/mole and started with methanol.

U.S. Pat. No. 5,731,396 discloses a water dispersible polyisocyanate mixture that is prepared by reacting lacquer polyisocyanates, e.g., HDI trimer having an NCO functionality of 1.8 to 4.6, with hydrophilic polyether/ester monols obtained by reacting polyether monol with ε-caprolactone, at an NCO/OH equivalent ratio of 4:1 to 120:1. The prepared water dispersible polyisocyanate mixture is useful in the preparation of polyurethane (PU) plastics or as a crosslinking agent for water soluble or water dispersible lacquer binders.

U.S. Pat. No. 6,007,619 relates to a process for preparing mortar/concrete compositions by incorporating into the mortar/concrete compositions either before or during the mixture operation a water dispersible polyisocyanate. With reference to the examples provided in U.S. Pat. No. 6,007,619, a poly ethoxylated ether monol having an average molecular weight of about 350 g/mole or 550 g/mole and started with methanol is added to a HDI-based polyisocyanate, and then the mixture is heated to 100° C. for 3 hours, so as to form the water dispersible polyisocyanate.

U.S. Pat. No. 6,221,995 discloses a modified polyisocyanate which has a high emulsifying/dispersing ability in an aqueous resin composition and can be advantageously used as a curing or crosslinking agent. The modified polyisocyanate prepared by reacting an HDI-based isocyanurate group-containing polyisocyanate and a nonionic emulsifying agent, such as a polyoxyethylene nonylphenyl ether, has a hydrophile-lipophile balance (HLB) of 17 or less and provides preferred performance when used in aqueous coatings, inks, and adhesives.

In view of the known technologies, the water dispersible polyisocyanates are normally prepared by reacting an aliphatic polyisocyanate based on HDI trimer with a nonionic polyether monol having a low molecular weight. Although some prior references disclose that polyether polyols can be used in modifying the hydrophilic ability of the polyisocyanates, no concrete and detailed descriptions or even embodiments with actual preparation procedures and test data of the utility of polyether polyols are provided. Surprisingly, the inventors of the present invention have found that specific polyether diols, triols, a mixture of polyether diols and triols, or a mixture of polyether monols and polyether polyols can be selected to prepare a water dispersible polyisocyanate composition that is more favorable for use in aqueous resins as a crosslinking agent, compared with those prepared solely by polyether monols. Particularly, the aqueous resin adhesives crosslinked with the water dispersible polyisocyanate composition of the subject invention have increased mechanical properties, such as green strength, adhesive ability, including the initial and aging adhesion, and heat resistance.

SUMMARY OF THE INVENTION

The present invention relates to a water dispersible polyisocyanate composition comprising
(a) an aliphatic polyisocyanate or a mixture of aliphatic polyisocyanates or a mixture of aliphatic polyisocyanates with other polyisocyanates; and
(b) a reaction product of component (a) with a component selected from the group consisting of:
(i) a polyether diol or triol or a mixture thereof wherein a weight ratio of ethylene oxide (EO) to propylene oxide (PO) of the polyether diol and triol is greater than about 60:40, and the polyether diol has a molecular weight of about 300 to 1600 g/mole, and the polyether triol has a molecular weight of about 450 to 2400 g/mole; and
(ii) a mixture of polyether monol and polyether polyol, wherein the polyether polyol is selected from the group consisting of polyether diol, triol and a mixture thereof, wherein a weight ratio of EO to PO of the polyether monol, diol and triol is greater than about 60:40, and the polyether diol and triol have the molecular weights as defined above.

The present invention further relates to an aqueous resin adhesive which contains the water dispersible polyisocyanate composition of the present invention and an aqueous resin containing active hydrogen reactive groups.

DETAILED DESCRIPTION OF THE INVENTION

Polyisocyanate

The polyisocyanate used in the present invention is an aliphatic polyisocyanate or a mixture of aliphatic polyisocyanates or a mixture of aliphatic polyisocyanates with other polyisocyanates having an average NCO functionality of about 2 to 6, preferably about 2.5 to 4, and an NCO content of about 5 to 30%, preferably about 10 to 25%.

In the present invention, suitable aliphatic polyisocyanates include, but are not limited to, isocyanates with following derivatives, such as isocyanurate, biuret, uretdione, urethane, allophanate, carbodiimide, oxidiazinetrione derivatives and mixtures thereof. The aliphatic polyisocyanates and their preparation processes are known and described in the prior art such as U.S. Pat. Nos. 4,518,522 and 4,663,377, the disclosures of which are incorporated by reference. Preferred aliphatic polyisocyanate is a cyclic polyisocyanate, such as isocyanurate derivative, biuret derivative or a mixture thereof, more preferably, HDI trimer, isophorone diisocyanate (IPDI) trimer, HDI/IPDI trimer, or a mixture thereof.

Other polyisocyanates for use in the subject invention may be any known and conventionally used in the art, such as aromatic polyisocyanates. Suitable aromatic polyisocyanates include, but are not limited to, 4,4-diphenylmethane diisocyanate (MDI), polymeric MDI, toluene diisocyanate, xylene diisocyanate and mixtures thereof. The aromatic polyisocyanates and their preparation processes are known and described in the prior art such as U.S. Pat. No. 4,939,191, the disclosures of which are incorporated by reference.

Polyether Alcohol

The polyether alcohols used in the present invention can be prepared through any known methods, such as by alkoxylation of suitable initiators with EO or a mixture of EO and PO. Suitable initiators for the production of the polyether monol, diol and triol (polyether alcohols) include, but are not limited to, methanol, ethanol, n-butanol, n-propanol, isopropanol, cyclohexanol, phenol, water, ethylene glycol, diethylene glycol (DEG), propylene glycol, glycerin, 2-butone oxime, aniline, trimethylol propane, and 3-methyl-3-hydroxymethyloxetane. EO or a mixture of EO and PO may be added sequentially and/or as mixtures in the alkoxylation reaction.

According to the present invention, the polyether alcohols have the weight ratio of EO to PO in the range of greater than about 60:40, preferably between about 70:30 and 90:10, and more preferably about 80:20. If the hydrophilic ability of the residual hydrophilic groups contained in the formed aqueous resin adhesive is too strong, the aqueous resin adhesive will have tendency to adsorb too much water in its hydrophilic groups, i.e., polyether alcohol blocks, so as to easily result in the hydrolysis of the neighboring urethane and ester groups and decrease its adhesive performance. Therefore, in the present invention, introducing a hydrophobic group, i.e., PO, in a proportion corresponding to a hydrophilc groups/hydrophobic groups ratio of greater than about 60:40, to the polyether alcohol for preparing a water dispersible polyisocyanate composition can provide a suitable prevention of the excessive consumption of the isocyanate groups during mixing of the polyisocyanates with the aqueous resin, and also enhance the initial adhesion by the linkage of the hydrophobic group with amine, hydroxyl, and/or carboxyl groups of the aqueous resin. Moreover, adopting an initiator with a longer alkyl chain, such as butanol, for the production of the polyether alcohols, can also decrease the hydrophilic ability of the formed aqueous resin adhesive to avoid undesired hydrolysis phenomena.

In the mixture of polyether monol and polyether polyol as a component of the reaction product (b), polyether monol and polyether polyol may be mixed in any suitable proportions, preferably in proportions corresponding to an equivalent ratio of about 1:4 to 3:2. The molecular weights of the polyether diol and triol used in the water dispersible polyisocyanate composition of the present invention are respectively about 300 to 1600 g/mole, preferably about 500 to 1000 g/mole, more preferably about 600 to 800 g/mole; and about 450 to 2400 g/mole, preferably about 600 to 1800 g/mole, more preferably 900 to 1200 g/mole. Any conventional polyether monol may be used in admixture with polyether polyols, preferably with the molecular weight of about 150 to 800 g/mole, more preferably about 300 to 500 g/mole.

Water Dispersible Polyisocyanate Composition

The reaction of the aliphatic polyisocyanate with the polyether alcohol to prepare the water dispersible polyisocyanate composition of the present invention is conducted by any known methods, such as those disclosed in U.S. Pat. Nos. 4,663,377 and 5,252,696. The starting components generally react together at temperature of about 20° C. to 120° C., preferably about 40° C. to 110° C., in proportions corresponding to an NCO/OH equivalent ratio of about 4:1 to 120:1, preferably 6:1 to 100:1, more preferably 10:1 to 30:1. The reaction time depends upon the reaction temperature and is normally about 2 to 4 hours. It may use catalysts to speed up the conversion.

The prepared water dispersible polyisocyanate composition normally has a viscosity of about 1500 to about 8000 cps/RT, preferably about 2000 to about 5500 cps/RT, more preferably about 2500 to about 4000 cps/RT (RT means room temperature). In one preferred embodiment, to further control the viscosity of the water dispersible polyisocyanate composition, an inert organic solvent of low boiling point may be added to the polyisocyanate composition before it is used. The organic solvent can be, but not limited to, ethyl acetate, acetone, dimethyl ethyleneglycol, methylethylketone, or a mixture thereof, preferably ethyl acetate, and its added amount is adjusted in order to control the viscosity of the final water dispersible polyisocyanate composition as desired, such as between 2500 and 4000 cps/RT.

The water dispersible polyisocyanate composition of the present invention is particularly useful as a crosslinking agent of aqueous resins containing active hydrogen reactive groups for the production of aqueous resin adhesives since the NCO functionality of the polyisocyanate composition of the present invention is increased, compared with those modified by polyether monols. Generally, the water dispersible polyisocyanate composition conventionally synthesized from a polyether monol and a polyisocyanate has a reduction of about 4% in its NCO functionality, based on that of the used polyisocyanate. As for the water dispersible polyisocyanate composition of the present invention, the NCO functionality has an increase of about 3.3% to 6%, based on that of the used polyisocyanate(s). The increased NCO functionality of the polyisocyanate composition of the present invention can enhance its crosslinking ability in aqueous resin adhesives.

Aqueous Resin Adhesive

According to the present invention, combining the water dispersible polyisocyanate composition of the present invention with the aqueous resins may be carried out by using any known stirring means, e.g., mechanical stirring.

Examples of suitable aqueous resins for the production of aqueous resin adhesives of the present invention include those containing active hydrogen reactive groups, such as a hydroxyl group, a amino group, a carboxyl group and the like, particularly a hydroxyl and amino group. According to the present invention, preferred aqueous resins are aqueous polyurethanes (PUs), aqueous polyvinyl acetates (PVACs), aqueous polyvinyl alcohols (PVOHs), aqueous hydroxy polyacrylates, and mixtures thereof, preferably aqueous PUs. As for the mixing of the water dispersible polyisocyanate composition and the aqueous resin, the amount of the water dispersible polyisocyanate composition is about 1 to 10 wt % preferably about 2 to 8 wt %, more preferably about 3 to 6 wt %, based on the weight of the aqueous resin.

The aqueous resin adhesive according to the present invention is suitable for bonding selected materials of the same or different types, for example, wood, paper, plastics, textiles, leather, and inorganic materials, especially PUs, PVCs, and rubbers.

The addition of the water dispersible polyisocyanate composition of the present invention to the aqueous resin causes, in particular, improvements in the adhesive ability, heat resistance, and mechanical properties, compared with commercial products.

The following examples serve to explain the invention in more detail. All percentages are percentages by weight unless otherwise indicated.

EXAMPLES

Example 1

The preparation of Water Dispersible Polyisocyanate Compositions by Using a Polyether Monol, Diol, or Triol HDI trimer, prepared by trimerizing HDI and having a viscosity of about 2000 to 2400 cps/25° C. and a NCO % of about 21 to 22% (commercially available from Bayer Corp., Rhodia Chimie or BASF Aktiengesellschaft), was added to a capped separating reactor and mechanically stirred with a Teflon bar at a rate of 300 rpm, followed by being heated to 100° C. As listed in Table 1, a polyether monol, diol, or triol commercially available from En Hou Polymer Chemical Industry Co., Ltd. (Taiwan) was slowly added to the reactor. The mixture reacted under the temperature of 100 to 105° C. for 3 hours, and then was cooled to room temperature.

TABLE 1

| Modifying material | Initiator | EO/PO ratio | MW (g/mole) |
|---|---|---|---|
| Polyether monol | | | |
| Monol-1 | Methanol | 100% EO | 350 |
| Monol-2 | Butanol | 80/20 | 350 |
| Monol-3 | Butanol | 100% EO | 350 |
| Monol-4 | Methanol | 100% EO | 800 |
| Monol-5 | Methanol | 100% EO | 2000 |
| Polyether diol | | | |
| Diol-1 | Diethylene glycol | 100% EO | 600 |
| Diol-2 | Propylene glycol | 80/20 | 700 |

TABLE 1-continued

| Modifying material | Initiator | EO/PO ratio | MW (g/mole) |
|---|---|---|---|
| Polyether triol | | | |
| Triol-1 | Glycerol | 100% EO | 1000 |

The amounts of HDI trimer and polyether alcohols for the production of water dispersible polyisocyanate compositions, and the NCO % and viscosities of the obtained water dispersible polyisocyanate compositions are shown in Table 2.

TABLE 2

| Sample number | Starting materials | Ratios in wt % | Ratios in equivalents | Added amounts (g) | NCO % | Viscosity (cps/RT) |
|---|---|---|---|---|---|---|
| 1 | HDI trimer | 93.13 | 24.34 | 279.4 | 18.90 | 2930/ |
|   | Monol-1 | 6.87 | 1 | 20.6 |  | 28.8 |
| 2 | HDI trimer | 93.13 | 24.34 | 279.4 | 19.27 | 2105/ |
|   | Monol-2 | 6.87 | 1 | 20.6 |  | 32.0 |
| 3 | HDI trimer | 93.13 | 24.34 | 279.4 | 19.20 | 1995/ |
|   | Monol-3 | 6 | 1 | 20.6 |  | 32.0 |
| 4 | HDI trimer | 93.13 | 55.64 | 279.4 | 18.61 | 3545/ |
|   | Monol-4 | 6.87 | 1 | 20.6 |  | 27.0 |
| 5 | HDI trimer | 93.13 | 139.11 | 279.4 | 19.92 | (a) |
|   | Monol-5 | 6.87 | 1 | 20.6 |  |  |
| 6 | HDI trimer | 93.13 | 20.87 | 279.4 | 19.38 | 8160/ |
|   | Diol-1 | 6.87 | 1 | 20.6 |  | 24.7 |
| 7 | HDI trimer | 93.13 | 24.34 | 279.4 | 19.15 | 7180/ |
|   | Diol-2 | 6.87 | 1 | 20.6 |  | 24.7 |
| 8 | HDI trimer | 93.13 | 23.18 | 279.4 | 19.95 | 5330/ |
|   | Triol-1 | 6.87 | 1 | 20.6 |  | 30.5 |

RT: room temperature
(a) The obtained composition was solidified at room temperature.

Example 2
The Preparation of Water Dispersible Polyisocyanate Compositions by Using Mixtures of a Polyether Monol and Diol in Different Proportions The preparation procedures were as those described in Example 1, except that a mixture of Monol-3 and Diol-2 were reacted with HDI trimer. The amounts of HDI trimer, Monol-3, and Diol-2 for the production of water dispersible polyisocyanate compositions, and the NCO % and viscosities of the obtained water dispersible polyisocyanate compositions are shown in Table 3.

TABLE 3

| Sample number | Starting materials | Ratios in wt % | Ratios in equivalents | Added amount (g) | NCO % | Viscosity (cps/RT) |
|---|---|---|---|---|---|---|
| 9 | HDI trimer | 93.13 | 24.34 | 279.4 | 19.15 | 2800/ |
|   | Monol-3 | 6.87 | 1 | 20.6 |  | 29.5 |
|   | Diol-2 | 0 | 0 | 0 |  |  |
| 10 | HDI trimer | 93.13 | 24.34 | 279.4 | 18.73 | 3960/ |
|   | Monol-3 | 3.435 | 0.5 | 10.3 |  | 29.5 |
|   | Diol-2 | 3.435 | 0.5 | 10.3 |  |  |
| 11 | HDI trimer | 93.13 | 24.34 | 279.4 | 19.25 | 4540/ |
|   | Monol-3 | 1.7175 | 0.25 | 5.15 |  | 29.5 |
|   | Diol-2 | 5.1525 | 0.75 | 15.45 |  |  |
| 12 | HDI trimer | 93.13 | 24.34 | 279.4 | 19.15 | 5540/ |
|   | Monol-3 | 0 | 0 | 0 |  | 29.5 |
|   | Diol-2 | 6.87 | 1 | 20.6 |  |  |

Example 3
Adhesion and Heat Resistance Test of the Aqueous PU Adhesives 0.8 g of the water dispersible polyisocyanate compositions according to the samples prepared in Examples 1 and 2 and 0.8 g of a commercial product (Sample C), an aliphatic polyisocyanate free of water, synthesized from HDI trimer and a polyether monol and having an NCO % of 18.5 to 20.5% and a viscosity of 3,000 mPa s/23° C., were respectively added to 20 g of aqueous PUs (trade name: GE-6608, manufactured by Great Eastern Resins Industrial Co., Ltd.) to prepare aqueous PU adhesives. Since the aqueous PUs for each test were obtained from different batch preparations, the test results were based on those of Sample C. In other words, the obtained data was for the comparison purpose of the adhesion or heat resistance, rather than an absolute value. The operational procedures for testing the adhesion and heat resistance of the aqueous PU adhesive between rubber substrates are as follows:

1. Using a roughening machine to roughen the surfaces of rubber substrates to be adhered.
2. The surfaces of the rubber substrates were treated with a primer (trade name: GE-001AB, manufactured by Great Eastern Resins Industrial Co., Ltd.).
3. The treated rubber substrates were dried in an oven at 60° C. for 3 minutes.
4. The dried rubber substrates were well coated with an aqueous PU adhesive containing a water dispersible polyisocyanate composition.
5. The coated rubber substrates were further dried in an oven at 60° C. for 5 minutes.
6. Two of the rubber substrates obtained from Step 5 were adhered through the coated surfaces, and then laminated under a pressure of 30 kg for 10 sec
7. The laminated rubber substrates were statically placed for 10 minutes, and then their initial green strength was tested by using Computer Type Universal Testing Machine.
8. The laminated rubber substrates were statically placed for 1 hour, and then their adhesion was tested by using Universal Testing Machine also.
9. The laminated rubber substrates were statically placed for 24 hours, and then their aging adhesion was tested by using Universal Testing Machine also.
10. The laminated rubber substrates were statically placed for 72 hours, and then placed in an oven of 70° C. and loaded with a mass of 1.5 kg for 60 hours, to test the heat resistance of aging.

Test (A)

The aqueous PU adhesives crosslinked with Sample 6, 7, or C were subjected to the adhesion and heat resistance tests according to the above procedures. The test results are shown in Table 4.

TABLE 4

| Test Time | Sample 6 | Sample 7 | Sample C |
|---|---|---|---|
| | Peel Strength (kg/2.5 cm) | | |
| 10 minutes | 13.8 | 18.5 | 11.1 |
| 1 hour | 20.75 | 25.5 | 19 |
| 24 hours | 20 | 31 | 18.5 |
| Heat resistance | | | |
| Falling time of the mass (min) | 1090 | No falling occurred | No falling occurred |
| Released distance between the substances (cm) | (b) | 2.5 | 5.5 |

(b) The substrates were thoroughly released.

According to the test results, the performances of Samples 6 and 7 in improving the adhesion of the aqueous PU adhesives greatly exceeded those of Sample C, i.e., the commercial product. Especially, Sample 7, having a viscosity of 7180 cps/RT (in the range of the present invention), was superior to Sample C in enhancing the heat resistance of the aqueous PU adhesives. Sample 6, having a viscosity of greater than 8000 cps/RT, however, showed slightly poorer performance in the heat resistance of the aqueous PU adhesives than that of Sample 7.

Test (B)

The aqueous PU adhesives crosslinked with Sample 8 or C were subjected to the adhesion and heat resistance tests according to the above procedures. The test results are shown in Table 5.

TABLE 5

| Test Time | Sample 8 | Sample C |
|---|---|---|
| | Peel Strength (kg/2.5 cm) | |
| 10 minutes | 18.8 | 18.5 |
| 1 hour | 26 | 22 |
| 24 hours | 34 | 25 |
| Heat resistance | | |
| Falling time of the mass (min) | No falling occurred | No falling occurred |
| Released distance between the substances (cm) | 2.8 | 3 |

The test results further proved that the adhesive ability and heat resistance of the aqueous PU adhesive crosslinked with Sample 8, having a viscosity of 5330 cps/RT (in the range of the present invention), was better than that crosslinked with Sample C, i.e., the commercial product.

Test (C)

The aqueous PU adhesives crosslinked with Sample 9, 10, 11, 12, or C were subjected to the adhesion and heat resistance tests according to the above procedures. The test results are shown in Table 6.

TABLE 6

| Test Time | Sample 9 | Sample 10 | Sample 11 | Sample 12 | Sample C |
|---|---|---|---|---|---|
| | Peel Strength (kg/2.5 cm) | | | | |
| 10 minutes | 13 | 15.5 | 10.5 | 11.5 | 10.5 |
| 1 hour | 13 | 25 | 36 | 22 | 11 |
| 24 hours | 16 | 38 | 37 | 37 | 17 |
| Heat resistance | | | | | |
| Falling time of the mass (mm) | 1284.7 | The substrates are broken | No falling occurred | No falling occurred | 1567 |
| Released distance between the substances (cm) | (b) | (c) | 1.6 | 4 | (b) |

(b) The substrates were thoroughly released.
(c) The broken substrates show that the adhesive performance of the aqueous PU adhesive is excellent.

Samples 10, having a viscosity of 3960 cps/RT (in the range of the present invention), and Sample 11, having a viscosity of 4540 cps/RT (in the range of the present invention), successfully not only possessed reduced viscosities so as to avoid hindering the dispersity of the NCO groups in water, but also maintained a high NCO functionality, which is advantageous to carry out crosslinking reaction. Clearly, the adhesion of the aqueous PU adhesive crosslinked with Sample 10 or 11 attained improvements. The test results also demonstrated that the aqueous PU adhesives crosslinked with Samples 10 and 11 possessed improved heat resistance.

Example 4
The Tensile Test of the Aqueous PU

The purpose of the tensile test was to learn the crosslinking degree that occurred in the material. Concretely, if the tensile strength of the tested material was increased (i.e., its elongation percentage is decreased), we could deduce that the crosslinking phenomenon occurred in the tested material. An aqueous PU was first prepared by a prepolymer mixing process. Particularly, a mixture of 77 g of a poly (hexalene adipate) (MW=2000) and 5.16 g of dimethylolpropionic acid (MW=134) in a solvent 28.30 g of methyl ethyl ketone was heated to 75° C. under stirring. 30.95 g of isophorone diisocyanate and a catalyst, dibutyltin dilaurate (trade name: T-12 manufactured by Air Products and Chemicals, Inc.), were added to the mixture, and then the mixture was reacted under 75° C. for 4 hours to obtain a prepolymer. The prepolymer was cooled to a temperature below 50° C. and then 3.89 g of triethyleneamine was added to the mixture to neutralize the carboxylic acid. 250 g of water was subsequently added to the prepolymer with stirring, or vice versa. Finally, 2.4 g of ethylediamine was added to the prepolymer to form an aqueous PU. The synthesized aqueous PU had a solid content of 30% and a molecular weight of about 30,000.

0.24, 0.48, or 0.96 g (2, 4, or 8%, based on the solid content of the aqueous PU) of Sample 7 was added to 40 g of the synthesized aqueous PU and the mixture was mechanically stirred for about 3 minutes. 10 g of the mixture was poured into a Teflon dish, and cured in a curing room (relative humidity, RH=60%) for one day, and then in a dry box (RH=40%) for 24 hours. A film with a thickness of about 0.3 to 0.4 mm was obtained from the Teflon dish. Finally, the film was put in a vacuum box at 60° C. for 4 hours, and then sealed with a PE bag and stored in a curing room (RH=60%). The tensile test was also conducted by using Universal Testing Machine. The test results (average values of 4 tests) are shown in Table 7.

TABLE 7

|  | 100% Modulus (MPA) | 300% Modulus (MPa) | 500% Modulus (MPa) | Elongation (%) |
| --- | --- | --- | --- | --- |
| PU | 3.527 | 2.068 | 2.416 | 683.08 |
| PU + 2% Sample 7 | 3.786 | 2.208 | 2.530 | 575.81 |
| PU + 4% Sample 7 | 3.864 | 2.289 | 2.718 | 608.08 |
| PU + 8% Sample 7 | 4.107 | 2.421 | 2.823 | 567.08 |

From the above data, the modulus of the aqueous PU grows with the added amount of Sample 7, and it shows that the aqueous PU containing Sample 7 indeed has a lower elongation percentage, compared with that free of Sample 7. Furthermore, the value of 100% modulus represents the strength against the initial tensile force and is meaningful to define the adhesive performance. The data listed in Table 7 again demonstrates that the aqueous PU containing Sample 7 has a higher value of 100% Modulus, compare with that free of Sample 7.

Although the present invention has been described in detail in the foregoing for the purpose of illustration, it is to be understood that such detail is solely for that purpose and that variations can be made therein by those skilled in this art without departing from the spirit and scope of the present invention except as it may be limited by the claims.

What is claimed is:

1. A water dispersible polyisocyanate composition comprising
   (a) an aliphatic polyisocyanate or a mixture of aliphatic with other polyisocyanates; and
   (b) a reaction product of component (a) with a component selected from the group consisting of:
      (i) a polyether diol or triol or a mixture thereof wherein a weight ratio of ethylene oxide (EO) to propylene oxide (PO) of the polyether diol and triol is greater than about 60:40, and the polyether diol has a molecular weight of about 300 to 1600 g/mole, and the polyether triol has a molecular weight of about 450 to 2400 g/mole, wherein the polyether diol, triol or mixture thereof is present in the reaction product in an amount effective to improve a peel resistance of an aqueous resin adhesive comprising the composition as compared with a peel resistance of the adhesive comprising the composition wherein the reaction product is a product of the aliphatic polyisocyanate and a polyether monol; and
      (ii) a mixture of polyether monol and polyether polyol, wherein the polyether polyol is selected from the group consisting of polyether diol, triol and a mixture thereof wherein a weight ratio of EO to PO of the polyether monol, diol and triol is greater than about 60:40, and the polyether diol and triol have the molecular weights as defined above, wherein the polyether monol and polyether polyol are present in the reaction product in respective amounts effective to improve a peel resistance of an aqueous resin adhesive comprising the composition as compared with a peel resistance of the adhesive comprising the composition wherein the reaction product is a product of the aliphatic polyisocyanate and the polyether monol alone.

2. The water dispersible polyisocyanate composition according to claim 1, wherein the aliphatic polyisocyanate is selected from the group consisting of isocyanurate, biuret, uretdione, urethane, allophanate, carbodiimide, oxadiazinetrione derivatives, and mixtures thereof.

3. The water dispersible polyisocysnate composition according to claim 2, wherein the aliphatic polyisocyanate is a cyclic polyisocyanate selected from the group consisting of isocyanurate derivative and biuret derivative, and a mixture thereof.

4. The water dispersible polyisocyanate composition according to claim 3, wherein the aliphatic polyisocyanate is selected from the group consisting of 1,6-hexamethylene diisocyanate (HDI) trimer, isophorone diisocyanate (IPDI) trimer, HDI/IPDI trimer, and a mixture thereof.

5. The water dispersible polyisocyanate composition according to claim 4, wherein the aliphatic polyisocyanate is HDI trimer.

6. The water dispersible polyisocyanate composition according to claim 1, wherein the other polyisocyanate is an aromatic polyisocyanate selected from the group consisting of 4,4-diphenylmethane diisocyanate (MDI), polymeric MDI, toluene diisocyanate, xylene diisocyanate, and a mixture thereof.

7. The water dispersible polyisocyanate composition according to claim 1, wherein the polyether monol has a molecular weight of about 150 to 800 g/mole, the polyether diol has a molecular weight of about 500 to 1000 g/mole, and the polyether triol has a molecular weight of about 600 to 1800 g/mole.

8. The water dispersible polyisocyanate composition according to claim 7, wherein the polyether monol has a molecular weight of about 300 to 500 g/mole, the polyether diol has a molecular weight of about 600 to 800 g/mole, and the polyether triol has a molecular weight of about 900 to 1200 g/mole.

9. The water dispersible polyisocyanate composition according to claim 1, wherein the weight ratio of EO to PO of the polyether monol, diol, and triol is between about 70:30 and 90:10.

10. The water dispersible polyisocyanate composition according to claim 9, wherein the weight ratio of EO to PO of the polyether monol, diol, and triol is about 80:20.

11. The water dispersible polyisocyanate composition according to claim 1, wherein in component (ii) the polyether monol and polyether polyol are in a proportion correspond to an equivalent ratio of about 1:4 to 3:2.

12. The water dispersible polyisocyanate composition according to claim 1, further comprising an inert organic solvent of low boiling point.

13. The water dispersible polyisocyanate composition according to claim 12, wherein the solvent is selected from the group consisting of ethyl acetate, acetone, dimethyl ethyleneglycol methylethylketone and a mixture thereof.

14. The water dispersible polyisocyanate composition according to claim 1, wherein the viscosity of the water dispersible polyisocyanate composition is about 1500 to 8000 cps/25.

15. The water dispersible polyisocyanate composition according to claim 14, wherein the viscosity of the water dispersible polyisocyanate composition is about 2000 to 5500 cps/25.

16. The water dispersible polyisocyanate composition according to claim 15, wherein the viscosity of the water dispersible polyisocyanate composition is about 2500 to 4000 cps/25536.

17. An aqueous resin adhesive comprising an aqueous resin and the water dispersible polyisocyanate composition according to claim 1.

18. The aqueous resin adhesive according to claim 17, wherein the water dispersible polyisocyanate composition is in an amount of about 1 to 10%, based on the weight of the aqueous resin.

19. The aqueous resin adhesive according to claim 18, wherein the water dispersible polyisocyanate composition is in an amount of about 2 to 8%, based on the weight of the aqueous resin.

20. The aqueous resin adhesive according to claim 19, wherein the water dispersible polyisocyanate composition is in an amount of about 3 to 6%, based on the weight of the aqueous resin.

21. The aqueous resin adhesive according to claim 17, wherein the aqueous resin is selected from the group consisting of polyurethane, polyvinyl acetate, polyvinyl alcohol, hydroxy polyacrylate and a mixture thereof.

22. The aqueous resin adhesive according to claim 21, wherein the aqueous resin is aqueous polyurethane.

23. In a water dispersible polyisocyanate composition comprising an aliphatic polyisocyanate and a reaction product of the aliphatic polyisocyanate and a polyether monol, the improvement wherein the reaction product is a product of the aliphatic polyisocyanate, the polyether monol and a polyether polyol with the polyether monol and polyether polyol being present in the reaction product in respective amounts effective to improve a peel resistance of an aqueous resin adhesive comprising the composition as compared with a peel resistance of the adhesive comprising the composition wherein the reaction product is a product of the aliphatic polyisocyanate and the polyether monol alone, the polyether polyol being selected from the group consisting of polyether diol, triol and a mixture thereof wherein a weight ratio of ethylene oxide to propylene oxide of the polyether monol, diol and triol is greater than about 60:40 and the polyether diol has a molecular weight of about 300 to 1600 g/mole and the polyether triol has a molecular weight of about 450 to 2400 g/mole, the composition having a viscosity of about 1500 to 8000 cps/25.

24. A water dispersible polyisocyanate composition comprising an aliphatic polyisocyanate and a reaction product of the aliphatic polyisocyanate and a polyether polyol, the polyether polyol being present in the reaction product in an amount effective to improve a peel resistance of an aqueous resin adhesive comprising the composition as compared with a peel resistance of the adhesive comprising the composition wherein the reaction prodact is a product of the aliphatic polyisocyanate and a polyether monol, the polyether polyol being selected from the group consisting of polyether diol, triol and a mixture thereof wherein a weight ratio of ethylene oxide to propylene oxide of the polyether diol and triol is greater than about 60:40 and the polyether diol has a molecular weight of about 300 to 1600 g/mole and the polyether triol has a molecular weight of about 450 to 2400 g/mole, the composition having a viscosity of about 1500 to 8000 cps/25.

* * * * *